(12) United States Patent
Fröhlich et al.

(10) Patent No.: US 11,303,174 B2
(45) Date of Patent: Apr. 12, 2022

(54) ROTOR FOR AN ELECTRIC MACHINE

(71) Applicant: CPT Group GmbH, Hannover (DE)

(72) Inventors: Holger Fröhlich, Berlin (DE); Isao Fukumoto, Berlin (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 16/329,905

(22) PCT Filed: Aug. 1, 2017

(86) PCT No.: PCT/EP2017/069428
§ 371 (c)(1),
(2) Date: Mar. 1, 2019

(87) PCT Pub. No.: WO2018/041504
PCT Pub. Date: Mar. 8, 2018

(65) Prior Publication Data
US 2019/0207449 A1    Jul. 4, 2019

(30) Foreign Application Priority Data

Sep. 2, 2016   (DE) ............... 10 2016 216 685.9

(51) Int. Cl.
*H02K 1/32*    (2006.01)
*H02K 1/30*    (2006.01)
(Continued)

(52) U.S. Cl.
CPC ............ *H02K 1/32* (2013.01); *H02K 1/30* (2013.01); *H02K 9/19* (2013.01); *H02K 17/165* (2013.01);
(Continued)

(58) Field of Classification Search
CPC ... F16C 3/00; H02K 1/22; H02K 1/28; H02K 1/30; H02K 15/0012; H02K 15/028;
(Continued)

(56) References Cited

U.S. PATENT DOCUMENTS 2,461,566 A * 2/1949 Morrill ............... H02K 17/165
310/156.76
2,927,229 A * 3/1960 Merrill ................. H02K 21/46
310/162
(Continued)

FOREIGN PATENT DOCUMENTS

| CN | 101656445 A | 2/2010 | ............. H02K 9/19 |
| CN | 101944813 A | 1/2011 | ............. H02K 1/16 |

(Continued)

OTHER PUBLICATIONS

German Office Action, Application No. 10 2016 216 685.9, 7 pages, dated Feb. 7, 2017.
(Continued)

*Primary Examiner* — Burton S Mullins
(74) *Attorney, Agent, or Firm* — Slayden Grubert Beard PLLC (57) ABSTRACT

Various embodiments may include a rotor for an electric machine, the rotor comprising: a first shaft journal; a second shaft journal; a laminated rotor core; a filler body cast onto the laminated rotor core wherein the filler body and the laminated rotor core rotate conjointly; and a cooling duct extending through the shaft journals and the filler body along an axis of the filler body and the rotor core. The filler body rotates with the shaft journals and a torque applied to the shaft journals is transmitted to the laminated rotor core.

10 Claims, 10 Drawing Sheets

(51) Int. Cl.
*H02K 9/19* (2006.01)
*H02K 17/16* (2006.01)
*H02K 15/02* (2006.01)
*B22D 19/00* (2006.01)
*H02K 1/12* (2006.01)
*H02K 3/50* (2006.01)

(52) U.S. Cl.
CPC ............ *B22D 19/0054* (2013.01); *H02K 1/12* (2013.01); *H02K 3/50* (2013.01); *H02K 15/028* (2013.01)

(58) Field of Classification Search
CPC ........ H02K 17/16; H02K 17/165; H02K 9/19; H02K 17/20; B22D 19/0054
USPC .............................. 310/61, 211, 598; 29/598
See application file for complete search history.

(56) References Cited

U.S. PATENT DOCUMENTS

| | | | | |
|---|---|---|---|---|
| 3,629,628 | A * | 12/1971 | Rank | B60L 1/02 |
| | | | | 310/54 |
| 4,600,848 | A * | 7/1986 | Sutrina | H02K 9/19 |
| | | | | 310/211 |
| 5,160,864 | A | 11/1992 | Saito | 310/54 |
| 7,834,492 | B2 * | 11/2010 | Iund | H02K 5/20 |
| | | | | 310/52 |
| 7,834,500 | B2 * | 11/2010 | Savant | H02K 7/108 |
| | | | | 192/56.6 |
| 8,242,645 | B2 * | 8/2012 | Tatematsu | H02K 1/2766 |
| | | | | 310/61 |
| 8,324,781 | B2 * | 12/2012 | Goto | H02K 7/04 |
| | | | | 310/216.117 |
| 8,344,576 | B2 * | 1/2013 | Hippen | H02K 17/165 |
| | | | | 310/211 |
| 8,492,941 | B2 * | 7/2013 | Endo | H02K 1/32 |
| | | | | 310/59 |
| 8,624,452 | B2 * | 1/2014 | Kubes | H02K 5/20 |
| | | | | 310/54 |
| 8,653,704 | B2 * | 2/2014 | Atarashi | B60K 6/405 |
| | | | | 310/54 |
| 8,663,020 | B2 * | 3/2014 | Murakami | H02K 9/19 |
| | | | | 464/7 |
| 8,896,166 | B2 * | 11/2014 | Hofkirchner | H02K 9/19 |
| | | | | 310/54 |
| 8,970,074 | B2 * | 3/2015 | Wagner | H02K 5/20 |
| | | | | 310/54 |
| 9,106,123 | B2 * | 8/2015 | Biesenbach | H02K 15/02 |
| 9,306,433 | B2 * | 4/2016 | Sten | H02K 9/197 |
| 2007/0114864 | A1 | 5/2007 | Son et al. | 310/90 |
| 2013/0221772 | A1 * | 8/2013 | Miyamoto | H02K 1/32 |
| | | | | 310/54 |
| 2015/0288255 | A1 * | 10/2015 | Barker | H02K 9/197 |
| | | | | 310/43 |
| 2016/0141923 | A1 * | 5/2016 | Frolich | H02K 19/103 |
| | | | | 310/46 |
| 2016/0164378 | A1 | 6/2016 | Gauthier et al. | 310/54 |
| 2016/0233744 | A1 * | 8/2016 | Kaneshige | H02K 9/19 |
| 2018/0191224 | A1 * | 7/2018 | Kotschau | H02K 9/10 |

FOREIGN PATENT DOCUMENTS

| | | | | |
|---|---|---|---|---|
| CN | 103296808 | A | 9/2013 | ............ H02K 1/32 |
| CN | 105680623 | A | 6/2016 | ............ H02K 9/00 |
| DE | 2525544 | * | 1/1976 | ............ H02K 1/28 |
| DE | 39 10 451 | A1 | 10/1989 | ............ H02K 9/19 |
| DE | 10 2007 056 206 | A1 | 5/2009 | ............ H02K 1/22 |
| DE | 10 2012 022 453 | A1 | 5/2014 | ............ H02K 1/32 |
| DE | 102012220629 | A1 | 5/2014 | ............ H02K 1/22 |
| DE | 10 2012 110 157 | A1 | 6/2014 | ............ H02K 1/22 |
| DE | 10 2013 020 331 | A1 | 7/2014 | ............ H02K 1/32 |
| DE | 102014107843 | * | 11/2015 | ............ H02K 9/19 |
| DE | 10 2015 205 724 | A1 | 6/2016 | ............ H02K 9/06 |
| EP | 2 744 089 | A1 | 6/2014 | ........... B22D 19/00 |
| EP | 002874286 | * | 5/2015 | ......... H02K 15/0012 |
| GB | 191503502 | * | 11/1915 | ......... H02K 15/0012 |
| JP | S57146739 | U | 9/1982 | ............ H02K 1/30 |
| JP | 2010239799 | A | 10/2010 | ............ H02K 1/27 |
| JP | 2010263696 | A | 11/2010 | ............ H02K 1/32 |
| JP | 2015089312 | A | 5/2015 | ............ H02K 1/28 |
| WO | 2006/064860 | A1 | 6/2006 | ............ H02K 1/28 |
| WO | 2018/041504 | A1 | 3/2018 | ............ H02K 1/30 |

OTHER PUBLICATIONS

International Search Report and Written Opinion, Application No. PCT/EP2017/069428, 27 pages, dated Oct. 26, 2017.

Chinese Office Action, Application No. 201780051833.2, 8 pages, dated Jun. 17, 2020.

* cited by examiner

ROTOR FOR AN ELECTRIC MACHINE

CROSS-REFERENCE TO RELATED APPLICATIONS

This application is a U.S. National Stage Application of International Application No. PCT/EP2017/069428 filed Aug. 1, 2017, which designates the United States of America, and claims priority to DE Application No. 10 2016 216 685.9 filed Sep. 2, 2016, the contents of which are hereby incorporated by reference in their entirety.

TECHNICAL FIELD

The present disclosure relates to electric machines. Various embodiments of the teachings herein may include a rotor for an electric machine.

BACKGROUND

Electric machines for a motor vehicle drivetrain, in particular for a hybrid drive, may be cooled by air, or possibly also water. Said cooling medium may be conducted through at least one region of the respective electric machine. Here, the cooling of the electric machines is limited because, by means of a cooling heat exchanger through which the liquid flows, typically only certain regions, such as the stator laminated core of the electric machine, can be cooled, and such cooling is commonly not possible in other regions of the machine. Furthermore, in many usage situations of electric machines, an available structural space is limited. Here, a water jacket or fan that must commonly be integrated comes at the expense of the structural space for the electric machine itself. It is basically to be assumed that intensive cooling of the electric machine increases the efficiency thereof.

Therefore, for the stated use, electric machines have become established which are cooled by means of an electrically insulating cooling liquid, for example an oil. Such oil-cooled electric machines not only have a heat exchanger through which oil flows but typically also exhibit direct cooling of the stator and/or of the rotor of the electric machine.

DE 39 10 451 A1 describes, in the case of a three-phase alternator, oil sprayed directly onto a stator iron and onto the parts surrounding the latter, and for said oil to be atomized, specifically by means of an oil pressure force and by means of a centrifugal force generated as a result of a rotation of an exciter winding, such that a stator winding can be cooled. A fraction of the sprayed oil which either has not reached the stator winding or drips off said stator winding passes onto the rotating exciter winding, such that the stator iron is thereby cooled. The oil may then flow off to the base of the bearing brackets and be conducted back to the oil reservoir through the oil outlet opening. The oil is thus recirculated in order to directly absorb heat from the stator winding and from the exciter winding during the operation of the three-phase alternator, whereby the three-phase alternator is cooled in an effective manner. It is evident that this direct cooling system is non-problematic with regard to insulation and corrosion, because the oil is an electrical insulator and is non-corrosive. The cooling of a rectifier may be realized for example by virtue of said rectifier being mounted on the outer side of the bearing bracket and a part of the oil duct being provided in the bearing bracket.

It is furthermore known that in particular medium-voltage and low-voltage motors are critical with regard to the rotor, that is to say the rotor constitutes a "hotspot" which must be cooled. It follows from this that the performance of the electric machine can be optimized through optimization of the rotor cooling.

SUMMARY

The present disclosure describes a particularly light-weight and efficiently coolable rotor for an electric machine, in particular a high-speed electric machine, wherein the rotor is capable of mechanically withstanding extremely high loads at high rotational speeds. For example, various embodiments may include a rotor (1) for an electric machine (39), the rotor (1) comprising a first shaft journal (2), a second shaft journal (3), a laminated rotor core (4) and a filler body (5), wherein the filler body (5) is cast onto the laminated rotor core (4), so that the laminated rotor core (4) is mounted rotationally conjointly on the filler body (5), the filler body (5) is connected rotationally conjointly to the shaft journals (2, 3), so that a torque is transmitted from the shaft journals (2, 3) to the laminated rotor core (4), and a cooling duct (23) extends through the shaft journals (2, 3) and the filler body (5) in an axial direction (L) of the rotor (1).

In some embodiments, the first shaft journal (2) has a first axial bore (21), the second shaft journal (3) has a second axial bore (22), the filler body (5) has a third axial bore (6), wherein the third axial bore (6) connects the first axial bore (21) to the second axial bore (22), so that the first bore (21), the second bore (22) and the third bore (6) together form the cooling duct (23) which runs through the first shaft journal (2), the filler body (5) and the second shaft journal (3).

In some embodiments, the first shaft journal (2), the second shaft journal (3) and the filler body (5) are formed in one piece.

In some embodiments, the laminated rotor core (4) is connected to the filler body (5) in positively locking and non-positively locking fashion in the axial direction (L).

In some embodiments, at least one of the shaft journals (2, 3) has an projection (11, 12), which is arranged on the end side, for centering purposes.

In some embodiments, at least one of the shaft journals (2, 3) has an end plate (19, 20), which is arranged on the end side, for fastening to the filler body (5).

In some embodiments, there is a media duct element (24), wherein the first shaft journal (2) has a first axial bore (21), the second shaft journal (3) has a second axial bore (22), the media duct element (24) is arranged between the shaft journals (2, 3) and the filler body (5), the media duct element (24) and the filler body (5) between them form a jacket-like cavity (25), the media duct element (24) has a fourth axial bore (6.1), wherein the fourth axial bore (6.1) connects the first bore (21) of the first shaft journal (2) to the second bore (22) of the second shaft journal (3), so that the first axial bore (21), the second axial bore (22) and the fourth axial bore (6.1) together form the cooling duct (23) which runs through the first shaft journal (2), the filler body (5) and the media duct element (24).

In some embodiments, the first shaft journal (2) and/or the second shaft journal (3) is formed in one piece with the media duct element (24).

In some embodiments, there is a first short-circuiting ring (27) and a second short-circuiting ring (28), wherein the first shaft journal (2) has a first radial bore (33), and the second shaft journal (3) has a second radial bore (34), the first radial bore (33) is connected to the first axial bore (21), the second radial bore (34) is connected to the second axial bore (22), the first short-circuiting ring (27) radially surrounds the first radial bore (33), and the second short-circuiting ring (28) radially surrounds the second radial bore (34), so that, during a rotation of the shaft journals (2, 3), a cooling medium can be centrifuged out of the radial bores (33, 34) radially to the outside in the direction of the short-circuiting rings (27, 28) and can cool the short-circuiting rings (27, 28).

In some embodiments, the media duct element (24) has a third radial bore (35) and a fourth radial bore (36), the third radial bore (35) and the fourth radial bore (36) connect the fourth axial bore (6.1) to the jacket-like cavity (25), the first shaft journal (2) and the filler body (5) between them form a first passage (37) which connects the jacket-like cavity (25) to the first short-circuiting ring (27), and the second shaft journal (3) and the filler body (5) between them form a second passage (38) which connects the jacket-like cavity (25) to the second short-circuiting ring (28).

As another example, some embodiments include an electric machine (39), comprising a rotor (1), a stator (40), a first stator end winding (41), and a second stator end winding (42), wherein the first stator end winding (41) surrounds the first short-circuiting ring (27), and the second stator end winding (42) surrounds the second short-circuiting ring (28), so that, during a rotation of the shaft journals (2, 3), a cooling medium can be centrifuged out of the radial bores (33, 34) radially to the outside in the direction of the stator end windings (41, 42) and can cool the stator end windings (41, 42).

BRIEF DESCRIPTION OF THE DRAWINGS

Exemplary embodiments of the teachings herein are explained in more detail below with reference to the schematic drawings, where identical or similar elements are provided with the same reference symbols. In the drawings.

DETAILED DESCRIPTION

Some embodiments include a rotor for an electric machine. In some embodiments, the rotor comprises a first shaft journal, a second shaft journal, a laminated rotor core, and a filler body, wherein the filler body is cast onto the laminated rotor core, so that the laminated rotor core is mounted rotationally conjointly on the filler body. The filler body is connected rotationally conjointly to the shaft journals, so that a torque is transmitted from the shaft journals to the laminated rotor core, and a cooling duct extends through the shaft journals and the filler body in an axial direction of the rotor.

In some embodiments, the rotor has an architecture with which a restriction to an actively magnetic-flux-directing laminated core cross section is possible, whereby a significant reduction in the weight of the rotor and a reduction in the mass moment of inertia of said rotor are made possible. In this case, a diameter of a central bore within the laminated rotor core may be selected to be particularly large. However, an active filler material of a lamination blank between a rotor shaft and active lamination material of the laminated rotor core can be dispensed with. Instead, when short-circuiting rings and short-circuiting bars are cast onto the laminated rotor core, the region of the formerly inactive lamination zone may also be at least partially filled with a melt, in particular with a light-metal alloy, for example with a die-cast aluminum alloy, whereby the filler body is formed. The cast-on filler body may serve for the centering of the shaft journals on both sides of the rotor. The construction-based advantages achieved by means of the rotor may be utilized for an integration of the functions of the rotor cooling in a variety of ways.

In some embodiments, the filler body furthermore performs the function, in particular, of transmitting torques between the shaft journals and the laminated rotor core. To this end, the filler body may be cast onto the laminated rotor core in such a way that the filler body is connected to the laminated rotor core in positively locking fashion. Furthermore, the shaft journals may be connected to the filler body in positively locking and non-positively locking fashion. In some embodiments, a continuous shaft can be dispensed with, and instead a transmissible torque can be ensured by means of the two shaft journals.

In some embodiments, a rotor incorporating teachings of the present disclosure is distinguished by a particularly low rotational mass moment of inertia. The particularly low weight of the squirrel-cage rotor is of particular value for the drive efficiency since the rotor is a rotating component; this is because the rotational mass moment of inertia of the rotor can be lowered by at least 10% with this design. This factor provides advantages in respect of efficiency for the acceleration process.

The cooling duct which extends through the shaft journals and the filler body in an axial direction permits, in particular, direct cooling of the shaft journals and of the filler body. Here, the cooling duct at least does not significantly reduce the efficiency of the electric machine and does not come at the expense of the structural space of the electric machine.

In some embodiments, an electric machine which has a rotor incorporating teachings of the present disclosure can, with maximum continuous power input, be of relatively small construction and nevertheless provide high electrical continuous power and a correspondingly high continuous torque. In some embodiments, a rotor or an electric machine incorporating these teachings may therefore be ideally suited to use in motor vehicles, in particular in electric or hybridized drivetrains of vehicles, because one of the core demands here is high performance with a minimal structural space. Here, such a rotor or an electric machine may be used in particular as a motor, generator and/or motor-generator in series or parallel hybridized drivetrains and also in purely electric drivetrains.

In some embodiments, the first shaft journal has a first axial bore, the second shaft journal has a second axial bore, and the filler body has a third axial bore, wherein the third axial bore connects the first axial bore to the second axial bore, so that the first bore, the second bore and the third bore together form the cooling duct which runs through the first shaft journal, the filler body and the second shaft journal. A cooling liquid duct may be generated by way of the shaft journals being mounted on the filler body. In this case, the shaft journals each have an axial bore which, together with an axial bore of the filler body, form the cooling liquid duct. The cooling liquid duct permits, in particular, direct cooling of the shaft journals and of the filler body.

In some embodiments, the first shaft journal, the second shaft journal, and the filler body may be formed in one piece. In this way, a rotor shaft which is cast as a whole onto the laminated rotor core is created, wherein the shaft journals may serve in particular as bearing seats.

In some embodiments, the laminated rotor core may be connected to the filler body in positively locking and non-positively locking fashion in the axial direction. The filler body may perform a clamp function for the individual laminations of the laminated rotor core. In particular, the filler body may be cast onto the laminated rotor core in such a way that the laminated rotor core is accommodated in a circumferential recess in the filler body, wherein end portions of the filler body which delimit the recess prevent displacement of the laminated rotor core in the axial direction and may hold together/clamp the laminated rotor core in non-positively locking fashion in the axial direction.

In some embodiments, at least one of the shaft journals may have a projection arranged on the end side for centering purposes. The projection may be inserted into a corresponding recess within the filler body, as a result of which the respective journal can be oriented and thus centered in relation to the filler body. In some embodiments, the projection may, for centering purposes, have multiple driver grooves distributed over the outer circumference of the projection, into which driver grooves in each case one driver peg of the filler body can engage, such that a positively locking connection in a direction of rotation of the rotor is created between the shaft journal and the filler body in the manner of a rotor torque driver.

In some embodiments, at least one of the shaft journals may have an end plate, which is arranged on the end side, for fastening to the filler body. The end plate serves as a fastening flange and permits a particularly resilient and durable connection of the shaft journals to the filler body.

In some embodiments, the rotor furthermore comprises a media duct element, wherein the first shaft journal has a first axial bore and the second shaft journal has a second axial bore. The media duct element may be arranged between the shaft journals and the filler body and forms a jacket-like cavity between itself and the filler body. The media duct element furthermore has a fourth axial bore, wherein the fourth axial bore connects the first bore of the first shaft journal to the second bore of the second shaft journal, so that the first axial bore, the second axial bore and the fourth axial bore together form the cooling duct which runs through the first shaft journal, the filler body and the media duct element. In some embodiments, by means of the cavity between the media duct element and the filler body, a mass can be reduced, which has a positive effect in particular on the mass moment of inertia of the electric machine.

In some embodiments, the first shaft journal and/or the second shaft journal may be formed in one piece with the media duct element. In this way, it is possible in particular to reduce the number of individual elements of the electric machine to be manufactured, which can in particular have a positive effect on the outlay for production and the outlay for assembly.

In some embodiments, the rotor may comprise a first short-circuiting ring and a second short-circuiting ring, wherein the first shaft journal has at least one first radial bore, and the second shaft journal has at least one second radial bore. The at least one first radial bore may be connected to the first axial bore, and the at least one second radial bore may be connected to the second axial bore. The first short-circuiting ring may radially surround the at least one first radial bore, and the second short-circuiting ring may radially surround the at least one second radial bore, so that, during a rotation of the shaft journals, a cooling medium can be centrifuged out of the radial bores radially to the outside in the direction of the short-circuiting rings and can cool the short-circuiting rings.

In some embodiments, the at least one first radial bore and the at least one second radial bore connect the first/second axial bore of the first/second shaft journal to the outer circumference of the first/second shaft journal. Instead of a single first radial bore and a single second bore, a plurality of first and second radial bores which are distributed, in particular, over the circumference of the shaft journals. The features mentioned in the preceding paragraph render possible intensive cooling of the short-circuiting rings, wherein the measures for cooling do not significantly reduce the degree of efficiency of the asynchronous machine and are not achieved at the expense of an increase in installation space of the asynchronous machine. The above-described cooling principle is particularly suitable in gearbox-integrated electric machines (GEM), which provide assistance to an internal combustion engine of a motor vehicle, and in traction electric machines (TEM), which can propel a motor vehicle on their own.

An electric machine having an above-described cooling system can, with maximum continuous power input, be of extremely small and compact construction, since the cooling of the short-circuiting rings can be performed by means of a cooling liquid, in particular an electrically insulating cooling liquid, for example an oil or an oil mist. In this case, the radial bores in the shaft journals form nozzles with which the cooling liquid can be distributed by means of centrifugal force such that the short-circuiting rings of the rotor and also end windings of a stator of the electric machine can be cooled. In this case, the cooling principle includes cooling of rotating and stationary components of the asynchronous machine in a closed housing.

In some embodiments, the electrically insulating cooling liquid can accordingly be conducted via the shaft journals and the filler body in each case into the region of the end sides of the rotor, where the cooling liquid is centrifuged by the centrifugal force to the short-circuiting rings and cools the rotor via the "hotspot short-circuiting ring". The short-circuiting ring may be composed of a die-cast aluminum alloy and therefore has a particularly high thermal conductivity.

In some embodiments, the media duct element may have a third radial bore and a fourth radial bore, wherein the third radial bore and the fourth radial bore connect the fourth axial bore to the jacket-like cavity, the first shaft journal and the filler body between them form a first passage, which connects the jacket-like cavity to the first short-circuiting ring, and the second shaft journal and the filler body between them form a second passage, which connects the jacket-like cavity to the second short-circuiting ring. This permits indirect cooling of the laminated rotor core via the cast filling, by means of coolant which is centrifuged radially out of the third and fourth radial bores onto an inner wall of the filler body. Furthermore, the short-circuiting rings may be cooled directly by virtue of coolant being conveyed out of the cavity through the first/second passage to the first/second short-circuiting ring.

In some embodiments, an asynchronous machine comprises a rotor as described above. In some embodiments, the electric machine comprises a stator, a first stator end winding, and a second stator end winding. The first stator end winding surrounds the first short-circuiting ring, and the second stator end winding surrounds the second short-circuiting ring, so that, during a rotation of the shaft journals, a cooling medium can be centrifuged out of the radial bores radially to the outside in the direction of the stator end windings and can cool the stator end windings.

The radial bores of the shaft journals therefore make it possible, during a rotation of the shaft journals, for an electrically insulating cooling liquid which is centrifuged out of the radial bores to be able to be conducted in the direction of and/or onto the stator end windings and, there, be able to cool the stator via the "hotspot stator end winding". The stator end winding may comprise of a copper winding with a particularly high thermal conductivity. In some embodiments, the electric machine may for example be cooled by means of an oil or an oil mist as coolant, and, in addition to a heat exchanger through which the coolant flows, exhibit direct cooling in particular of the shaft journals, of the short-circuiting rings of the rotor and of the stator end windings of the stator of the asynchronous machine.

Figure 1:
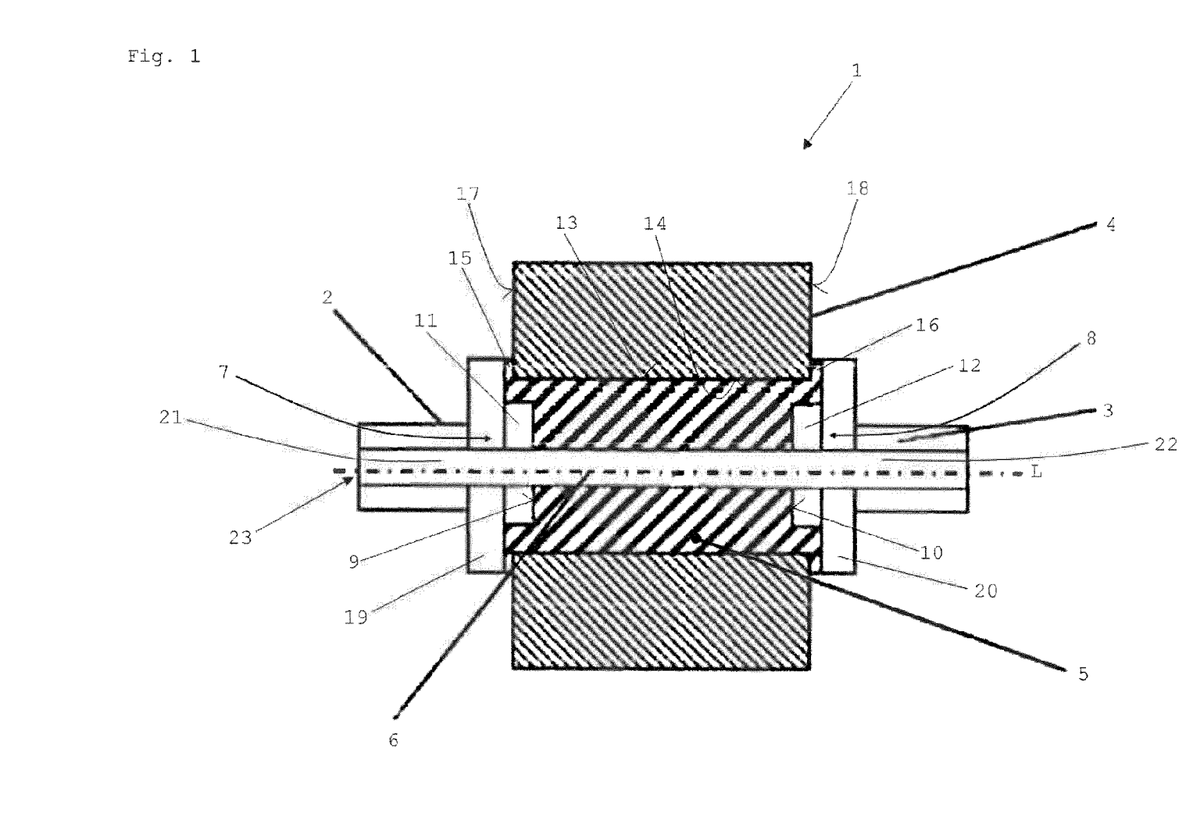
FIG. 1 is a longitudinal sectional illustration of an exemplary embodiment of a rotor incorporating teachings of the present disclosure with two shaft journals and with a filler body.
Figure 13:
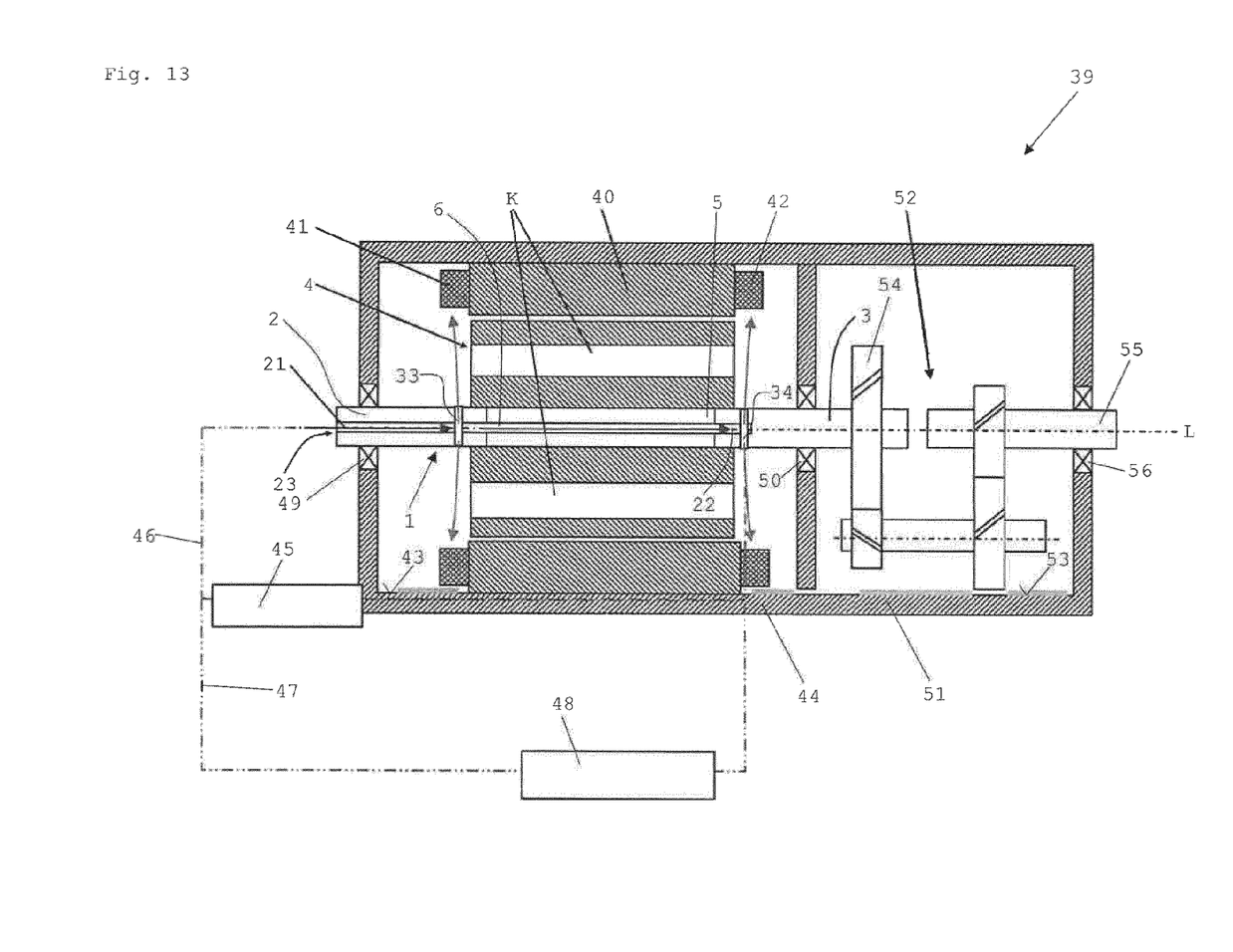
FIG. 13 is a longitudinal sectional illustration of an exemplary embodiment of an electric machine incorporating teachings of the present disclosure.

FIG. 1 shows a rotor 1 for an electric machine, for example an electric machine 39 according to FIG. 13. The rotor 1 comprises a first shaft journal 2, a second shaft journal 3, a laminated rotor core 4, and a filler body 5. The filler body 5 is cast onto the laminated rotor core 4 and connected to the laminated rotor core 4, for example in positively locking fashion, such that the filler body 5 and the laminated rotor core 4 are connected rotationally conjointly to one another. Therefore, a torque can be transmitted from the filler body 5 to the laminated rotor core 4, and vice versa. In some embodiments, a rotational movement of the filler body 5 about a longitudinal axis L of the rotor 1 can be transmitted to the laminated rotor core 4, so that the laminated rotor core 4 also rotates about the longitudinal axis L. The filler body 5 is substantially of hollow cylindrical configuration and has a ring-shaped cross section. A central bore 6 extends through the filler body 5 from a first end side 7, illustrated on the left in FIG. 1, of the filler body 5 to a second end side 8, illustrated on the right in FIG. 1, of the filler body 5.

The first end side 7 has a first recess 9, and the second end side 8 has a second recess 10. The first shaft journal 2 has a first centering ring 11 at its end illustrated on the right in FIG. 1, and the second shaft journal 3 has a second centering ring 12 at its end illustrated on the left in FIG. 1. The shape of the first centering ring 11 corresponds to the shape of the first recess 9, and the shape of the second centering ring 12 corresponds to the shape of the second recess 10. In the exemplary embodiment shown by FIG. 1, the centering rings 11 and 12 each have a ring-shaped and cylindrical cross section with an outside diameter which corresponds to an inside diameter of the plate-like recess 9 or 10 respectively.

The first centering ring 11 is inserted into the first recess 9, and the second centering ring 12 is inserted into the second recess 10. In this way, the first shaft journal 2 is oriented with respect to the filler body 5 by means of the first recess 9 and the first centering ring 11, wherein a longitudinal axis L of the first shaft journal 2 corresponds to a longitudinal axis L of the filler body 5. The first shaft journal 2 and the filler body 5 are constructed in an axially symmetrical manner in relation to the longitudinal axis L. In a similar way, the second shaft journal 3 is oriented with respect to the filler body 5 by means of the second recess 10 and the second centering ring 12, wherein a longitudinal axis L of the second shaft journal 3 likewise corresponds to the longitudinal axis L of the filler body 5 and the second shaft journal 3 is constructed in an axially symmetrical manner in relation to the longitudinal axis L.

The filler body 5 has, on its outer circumference, a third recess 13 which extends over a large region of the outer circumference. A central bore 14 of the laminated rotor core 4 corresponds to the third recess 13, wherein in particular an inside diameter of the central bore 14 and an outside diameter of the third recess 13 may be matched to one another in such a way that a non-positively locking shaft-hub connection is created between the filler body 5 and the laminated rotor core. The third recess 13 is delimited in the longitudinal direction L by two radially running end portions 15 and 16. The laminated rotor core 4 has a first end side 17 illustrated on the left in FIG. 1 and has a second end side 18 illustrated on the right in FIG. 1. The filler body 5 is, by way of its end portions 15 and 16, cast onto the end sides 17 and 18 of the laminated rotor core 4 in such a way that the individual laminations of the laminated rotor core 4 are pressed axially against one another by the end portions 15 and 16 (non-positive locking), but are at least axially held together (positive locking). In this way, the end portions 15 and 16 can hold together or clamp the laminated rotor core 4, that is to say they perform a kind of "clamp function" for the laminated rotor core 4, which is held together in the longitudinal direction L by the end portions 15 and 16. Alternatively, the protruding end portions 15 and 16 may be omitted, whereby the optional "bracket function" is omitted (cf. FIG. 3).

The first shaft journal 2 is connected in positively locking fashion and rotationally conjointly to the filler body 5, and the second shaft journal 3 is likewise connected in positively locking fashion and rotationally conjointly to the filler body 5. The connection between the shaft journals 2 and 3 and the filler body 5 may for example be realized by means of a screw connection (not shown by FIG. 1), a recess and a locking pin, or by means of a driver groove and a driver peg.

According to the exemplary embodiment shown by FIG. 1, for this purpose, the first shaft journal 2 has a first screw-on flange or a first fastening ring 19, and the second shaft journal 3 has a second screw-on flange or a second fastening ring 20. The fastening rings 19 and 20 are of cylindrical configuration and have a ring-shaped cross section, wherein an outside diameter of the fastening rings 19 and 20 is in each case greater than the outside diameter of the centering rings 11 and 12. The fastening rings 19 and 20 each lie with their end sides against one of the end sides 7 and 8 respectively of the filler body 5. The shaft journals 2 and 3 may for example be screwed to the filler body 5 in the region of these contact areas. Torques can be transmitted between the shaft journals 2 and 3 and the filler body 5 owing to the rotationally conjoint connection between the filler body 5 and the first shaft journal 2 on the one hand and also the second shaft journal 3 on the other hand. In particular, a rotational movement of the first shaft journal 2 and/or of the second shaft journal 3 can be transmitted to the filler body 5. Rotational movements and torques can also be transmitted from the filler body 5 to the laminated rotor core 4 owing to the rotationally conjoint connection between the filler body 5 and the laminated rotor core 4 (see above). Consequently, rotational movements and torques can be transmitted from the first shaft journal 2 and/or the second shaft journal 3 to the laminated rotor core 4 via the filler body 5.

The first shaft journal 2 has a central first bore 21, and the second shaft journal 3 has a central second bore 22. The bores 21 and 22 extend through the shaft journals 2 and 3 in the longitudinal direction L in such a way that the bores 21 and 22 connect opposite end sides of the shaft journals 2 and 3 respectively to one another. In this case, the bores 21 and 22 of the shaft journals 2 and 3 are in alignment with the central bore 6 ("third bore") of the filler body 5. Therefore, the bores 21 and 22 of the shaft journals 2 and 3 are connected to the central bore 6 of the filler body 5, whereby a cooling duct 23 which runs through the entire squirrel-cage rotor 1 in the longitudinal direction L is formed. In particular, a cooling liquid, for example an oil or an oil mist, can be conducted through the cooling duct 23, whereby the shaft journals 2 and 3 and the filler body 5 can be cooled from inside.

Figure 2:
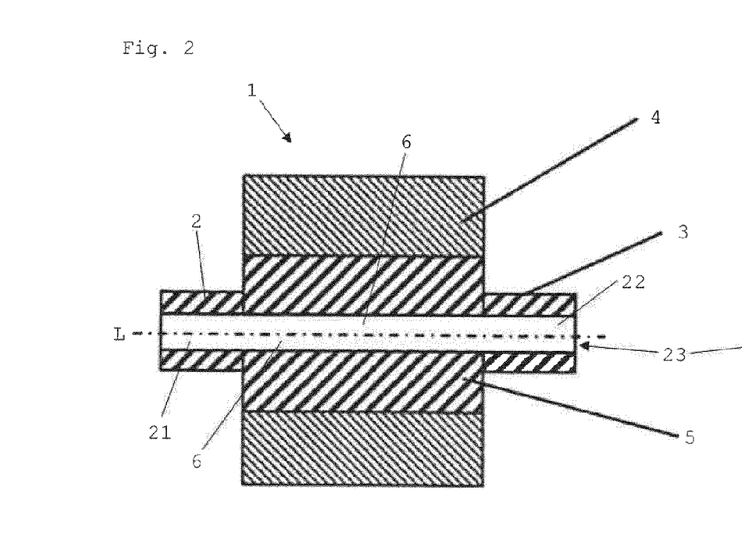
FIG. 2 is a longitudinal sectional illustration of a further exemplary embodiment of a rotor incorporating teachings of the present disclosure with shaft journals which are formed in one piece with a filler body.

FIG. 2 shows a rotor 1 for an electric machine. The rotor 1 comprises a first shaft journal 2, a second shaft journal 3, a filler body 5 and a rotor laminated core 4. In the exemplary embodiment shown by FIG. 2, the first shaft journal 2, the second shaft journal 3, and the filler body 5 are formed in one piece. A cooling duct 23 is designed similarly to that in the exemplary embodiment according to FIG. 1. The cooling duct 23 is made up of a first axial bore 21 of the first shaft journal 2, a second axial bore 22 of the second shaft journal 3 and a third bore 6 of the filler body 5, and extends in an axial direction L all the way through the rotor shaft formed by the shaft journals 2, 3 and the filler body 5.

Figure 3:
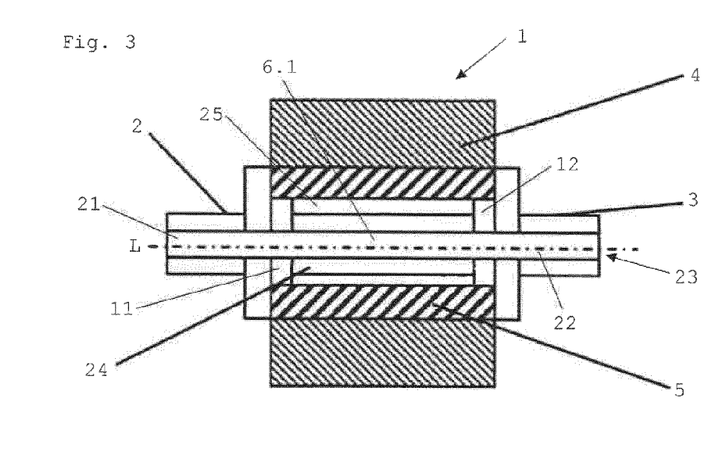
FIG. 3 is a longitudinal sectional illustration of a further exemplary embodiment of a rotor incorporating teachings of the present disclosure with two shaft journals, a filler body and a media duct element.

FIG. 3 shows a further rotor 1 for an electric machine. The rotor 1 according to FIG. 3 is of similar design to the rotor according to FIG. 1. In particular, a first shaft journal 2, a second shaft journal 3, and a laminated rotor core 4 of the rotor 1 are shown in a design identical to that in FIG. 1. However, by contrast to the exemplary embodiment as per FIG. 1, a filler body 5 of the rotor 1 is of hollowed-out design in a region between the first centering ring 11 and the second centering ring 12. In other words, between the centering rings 11 and 12, the filler body 5 has no mass. Between the centering rings 11 and 12, in the mass-free chamber of the filler body 5, there is situated a media duct element 24, which has a fourth central axial bore 6.1. Said axial bore 6.1 is connected to a first axial bore 21 of the first shaft journal 2 and to a second axial bore 22 of the second shaft journal 3 such that a cooling duct 23 is formed. The filler body 5 and the media duct element 24 form between them a jacket-like cavity 25, by means of which the mass of the rotor 1 can be reduced, and through which in particular a cooling medium for cooling components of the rotor 1 can be conducted. The first shaft journal 2 or the second shaft journal 3 may furthermore be formed in one piece with the media duct element 24.

Figure 4:
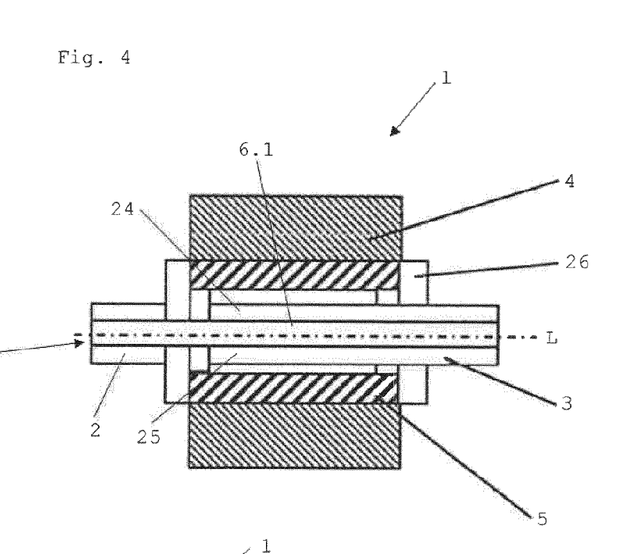
FIG. 4 is a longitudinal sectional illustration of a further exemplary embodiment of a rotor incorporating teachings of the present disclosure with two shaft journals, a filler body and a media duct element, which are integrally connected to one another.

The further exemplary embodiment, shown by FIG. 4, of a further rotor 1 for an electric machine differs from the rotor 1 as per FIG. 3 by the design of the shaft journals 2, 3 and of the media duct element 24. The first shaft journal 2, the second shaft journal 3 and the media duct element 24 are formed in one piece, wherein an end plate 26 has been pushed onto the second shaft journal 3 and fixedly connected to the filler body 5.

Figure 5:
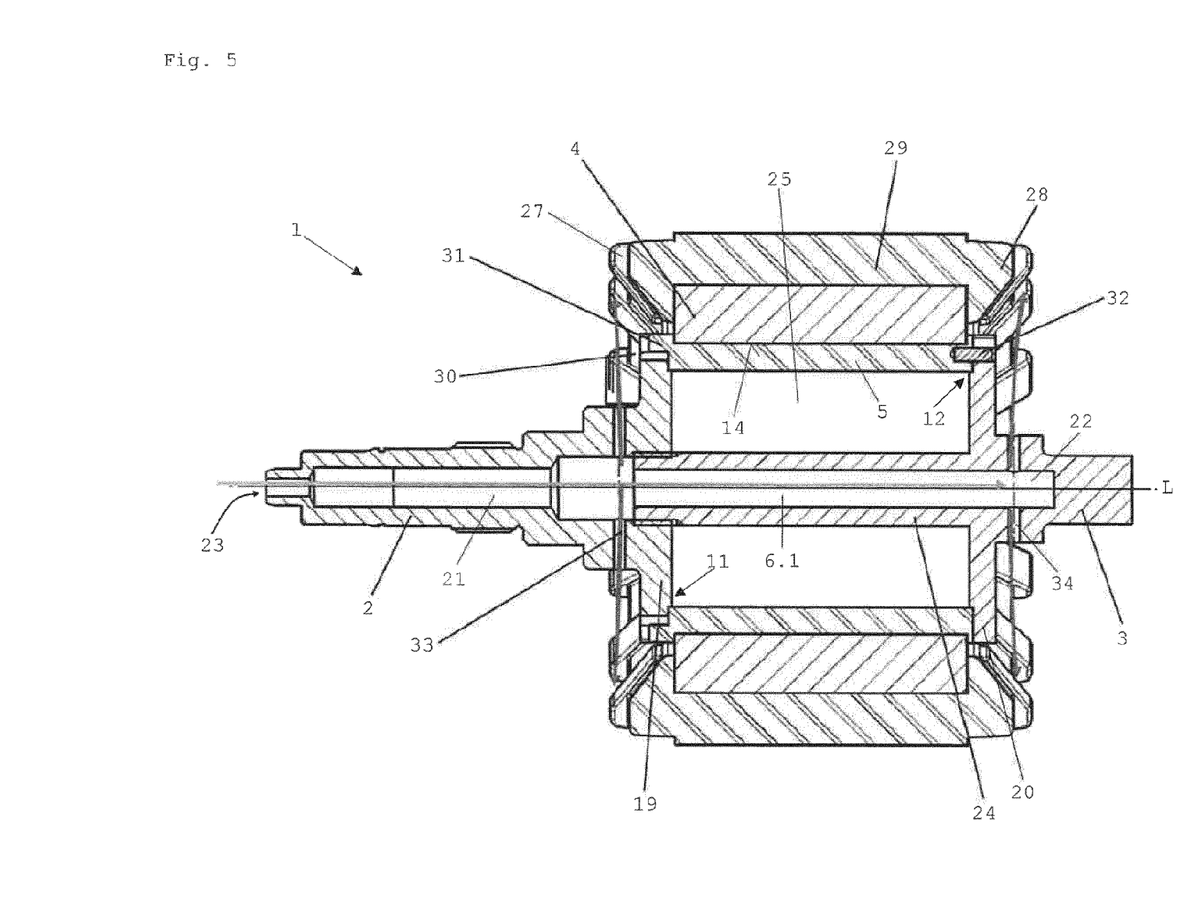
FIG. 5 is a longitudinal sectional illustration of a further exemplary embodiment of a rotor incorporating teachings of the present disclosure with radial cooling ducts.

FIG. 5 shows, in detail, how a rotor 1 may be equipped. The filler body 5 does not fill the entire cavity within a central bore 14 of the laminated rotor core 4, but rather forms a cavity between itself and a media duct element 24. The rotor 1 comprises a first short-circuiting ring 27 at a first end side and a second short-circuiting ring 28 at a second end side. The short-circuiting rings 27 and 28 are connected to one another by means of a plurality of short-circuiting bars 29 which are accommodated in slots in the laminated rotor core 4. The slots or the short-circuiting bars 29 run parallel in relation to one another and parallel in relation to the longitudinal axis L. Furthermore, the short-circuiting bars 29 are spaced apart from one another in each case equidistantly in a circumferential direction of the laminated rotor core 4.

The rotor 1 comprises a first shaft journal 2, which has a first fastening ring 19 with multiple driver grooves 30 arranged so as to be distributed in the circumferential direction and into which in each case one driver peg 31 of the filler body 5 projects. In this way, the first shaft journal 2 and the filler body 5 are connected to one another in positively locking fashion and rotationally conjointly in a circumferential direction of the rotor 1. A second shaft journal 3 has a second fastening ring 20, which is fastened by means of a locking pin 32 to the filler body.

The first shaft journal 2 has a plurality of first radial bores 33 which are distributed in the circumferential direction, and the second shaft journal 3 has a plurality of second radial bores 34 which are distributed in the circumferential direction. The radial bores 33 and 34 run perpendicular in relation to the longitudinal axis L of the rotor 1, wherein the first radial bores 33 connect a first axial bore 21 of the first shaft journal 2 to a first outer circumferential surface of the first shaft journal 2, and the second radial bores 34 connect a second axial bore 22 of the second shaft journal 3 to a second outer circumferential surface of the second shaft journal 3. The first axial bore 21 and the second axial bore 22 are connected to a fourth axial bore 6.1 within the filler body 5 and together form a portion of a cooling duct 23, which furthermore comprises the radial bores 33 and 34.

In the exemplary embodiment shown by FIG. 5, the second shaft journal 3 is formed in one piece with the media duct element 24. In other words, the media duct element 24 is jointly integrated into the second shaft journal 3. The first shaft journal 2 is shrink-fitted in positively locking fashion onto the media duct element 24.

A cooling medium, for example an oil or an oil mist, may be conducted through the cooling duct 23. A possible flow direction of the cooling medium within the cooling duct 23 is indicated by arrows in FIG. 5. The cooling medium may be conveyed through the cooling duct 23 for example by means of a pump (not shown). As an alternative, the laminated rotor core 4 may have helical cooling ducts which, during a rotation of the laminated rotor core 4, permit a suction action by means of which the cooling medium is drawn into the cooling duct 23, conducted through it and conveyed out of it without the need for a pump.

During a rotation of the first shaft journal 2 and of the second shaft journal 3, the cooling medium situated within the cooling duct 23 is conveyed through the radial bores 33 and 34, and centrifuged out of said radial bores in the radial direction, by centrifugal forces which act on the cooling medium within the radial bores 33 and 34. The first radial bore 33 of the first shaft journal 2 is surrounded in the radial direction by the first short-circuiting ring 27, and the second radial bore 34 of the second shaft journal 3 is surrounded in the radial direction by the second short-circuiting ring 28. During the further course of its movement, the cooling medium which is centrifuged out of the radial bores 33 and 34 impinges on the first short-circuiting ring 27 and the second short-circuiting ring 28 respectively and cools them.

Figure 6:
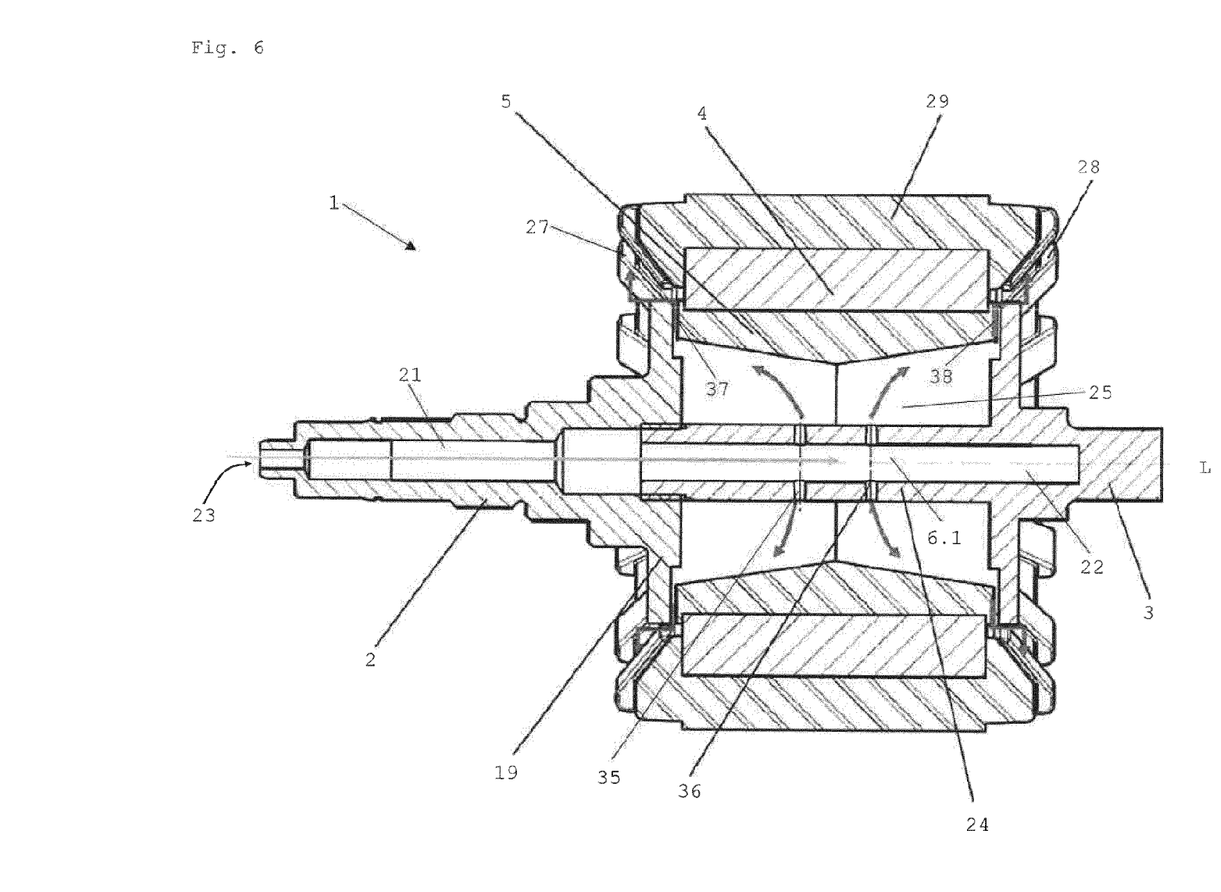
FIG. 6 is an alternative longitudinal sectional illustration of the rotor according to FIG. 5.
Figure 7:
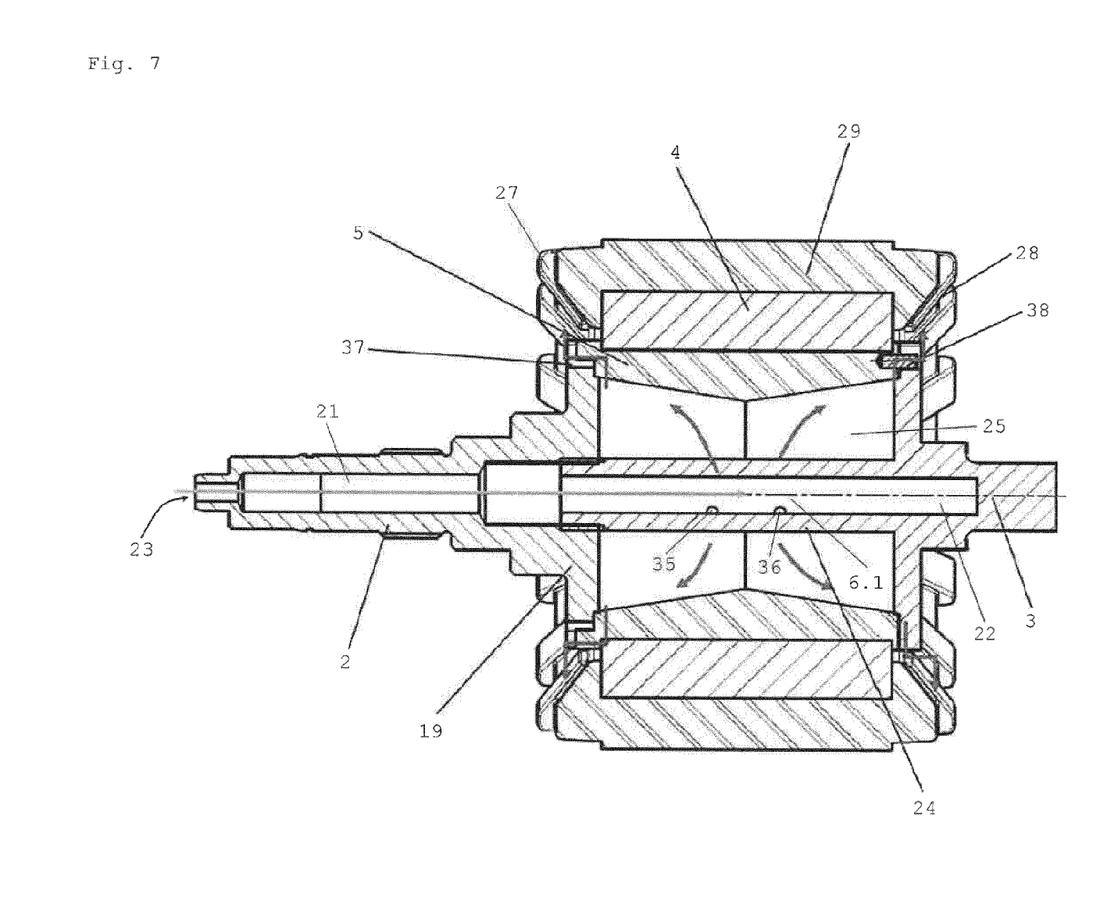
FIG. 7 is a further alternative longitudinal sectional illustration of the rotor according to FIG. 5.

FIGS. 6 and 7 show that the rotor 1 according to FIG. 5 has a third radial bore 35 and a fourth radial bore 36. The third radial bore 35 and the fourth radial bore 36 connect the fourth axial bore 6.1 to the jacket-like cavity 25 between the filler body 5 and the media duct element 24. The first shaft journal 2 and the filler body 5 between them form a first passage 37 which connects the jacket-like cavity 25 to the first short-circuiting ring 27. Similarly, the second shaft journal 3 and the filler body between them form a second passage 38 which connects the jacket-like cavity 25 to the second short-circuiting ring 28. Possible flow directions of cooling medium through the cooling duct 23, the cavity 25 and the passages 37 and 38 to the short-circuiting rings 27 and 28 are illustrated in FIGS. 6 and 7 by arrows. FIGS. 8 to 11 show detailed views of above-described details of the rotor according to FIG. 5.

Figure 8:
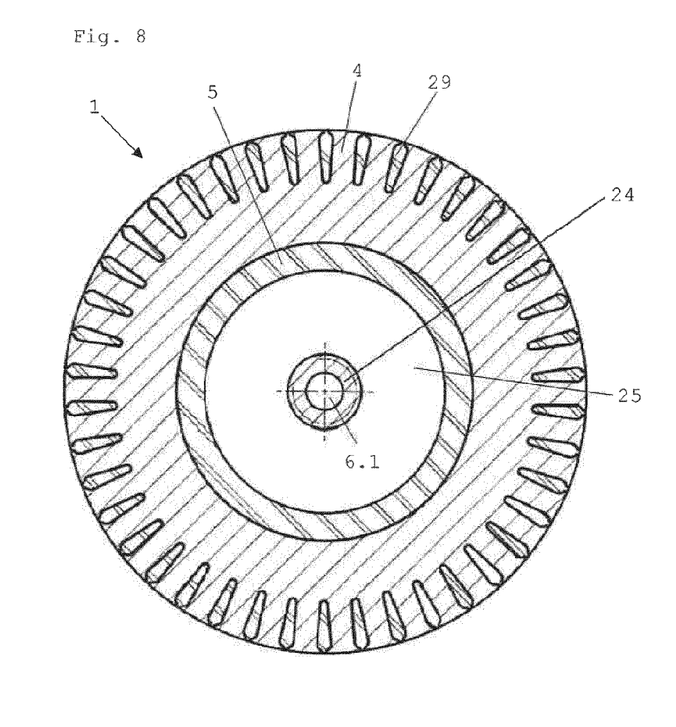
FIG. 8 is a cross-sectional illustration of the rotor according to FIG. 5 through the media duct element thereof.
Figure 9:
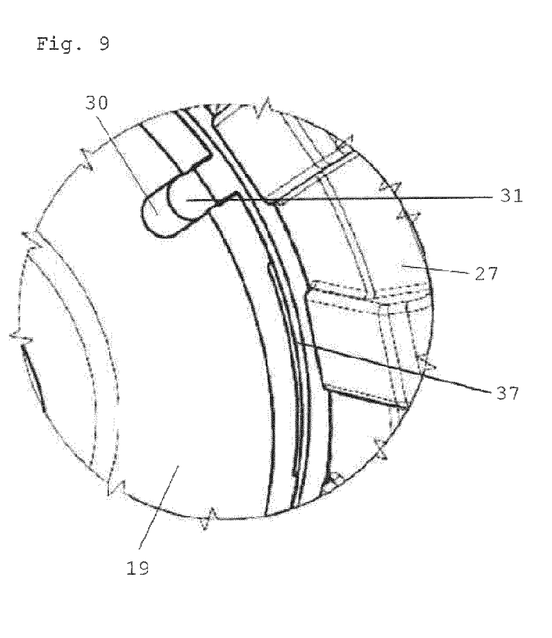
FIG. 9 shows a perspective view of a torque-transmitting connection between a filler body and a first shaft journal of the rotor according to FIG. 5.
Figure 10:
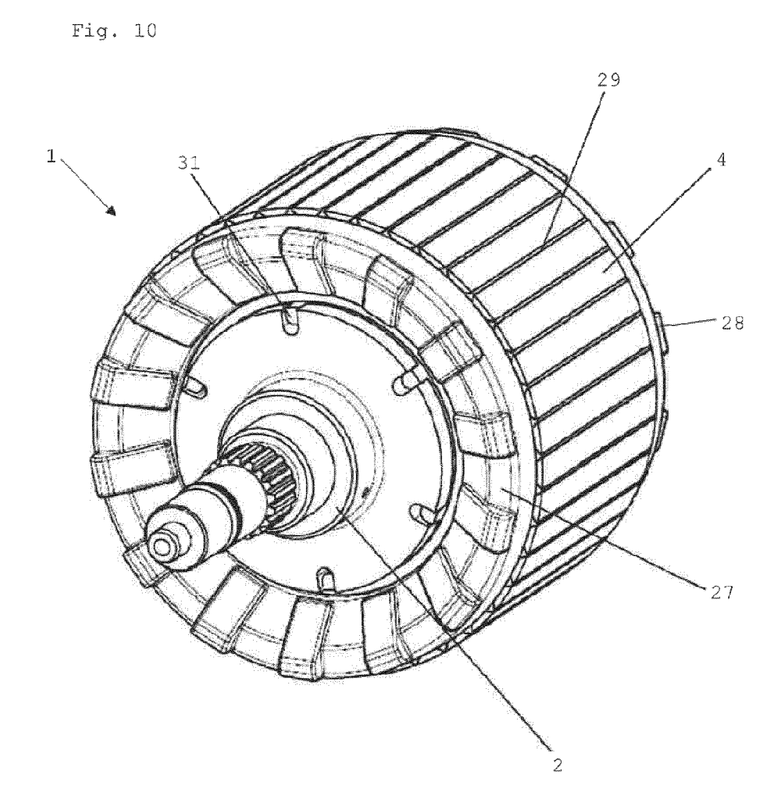
FIG. 10 shows a perspective view of the rotor according to FIG. 5.
Figure 11:
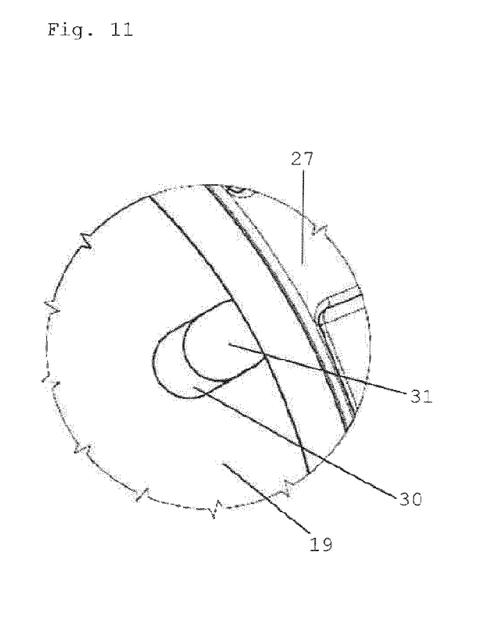
FIG. 11 shows an enlarged detail view from FIG. 10.
Figure 12:
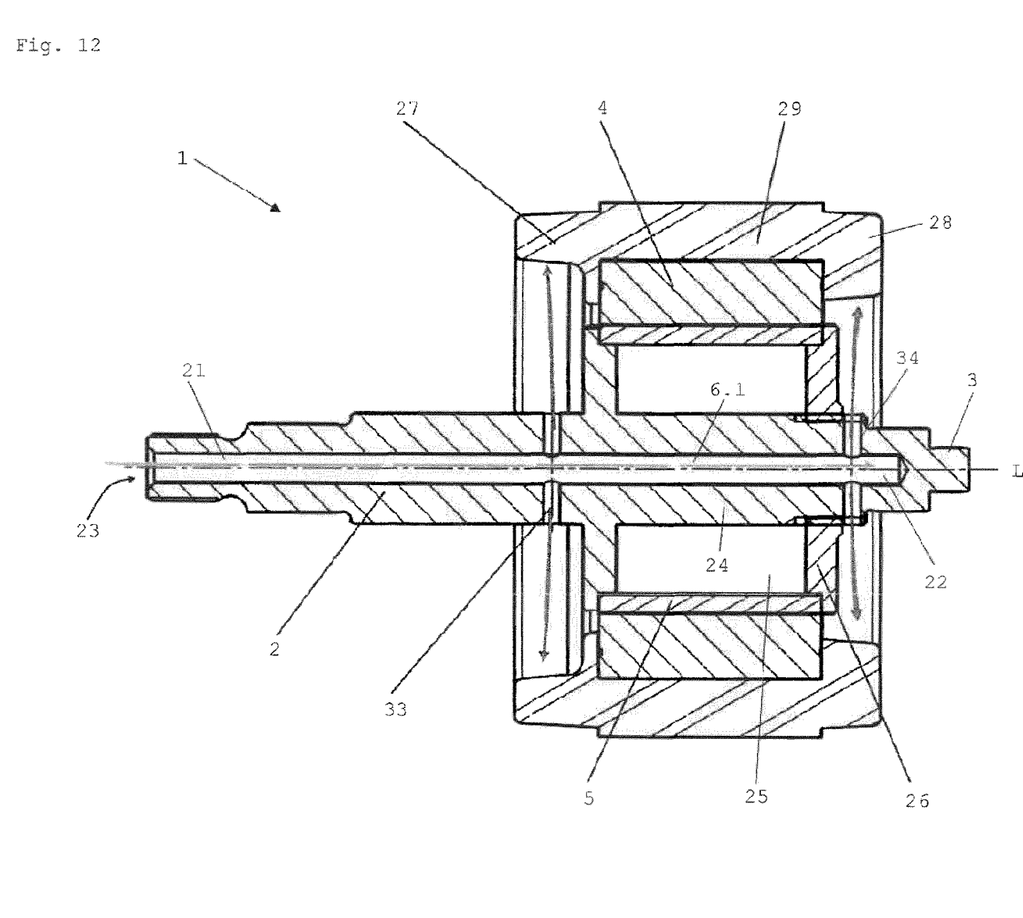
FIG. 12 is a longitudinal sectional illustration of a further exemplary embodiment of a rotor incorporating teachings of the present disclosure with radial cooling ducts and with an end plate.

FIG. 12 shows a further rotor 1 for an electric machine, wherein—similarly to the exemplary embodiment according to FIG. 4—a first shaft journal 2, a second shaft journal 3 and a media duct element 24 are formed in one piece, wherein an end plate 26 has been pushed onto the second shaft journal 3 and fixedly connected to a filler body 5. Furthermore, a cooling duct 23 comprises a first axial bore 21 within a first shaft journal 2, a second axial bore 22 within a second shaft journal 3, a fourth axial bore 6.1 within the media duct element 24, and also a first radial bore 33 within the first shaft journal 2 and a second radial bore 34 within the second shaft journal 3. Possible flow directions of cooling medium through the cooling duct 23 to the short-circuiting rings 27 and 28 are illustrated in FIG. 8 by arrows.

FIG. 13 shows an electric machine 39 having a rotor 1 which may be of similar construction to the rotors 1 according to FIGS. 1 to 12. The rotor 1 is surrounded in the radial direction by a stator 40 having a first stator end winding 41, which is illustrated on the left in FIG. 13, and having a second stator end winding 42, which is illustrated on the right in FIG. 13. The stator end windings 41 and 42 each surround a short-circuiting ring (not shown by FIG. 13) of the rotor 1 (in this regard, cf. for example FIG. 5). The laminated rotor core 4 of the rotor 1 furthermore comprises punched-in cooling ducts K.

A first shaft journal 2 of the rotor 1 has a plurality of radial first bores 33 which are distributed in the circumferential direction. A second shaft journal 3 of the squirrel-cage rotor 1 likewise has a plurality of second radial bores 34 which are distributed in the circumferential direction. The first stator end winding 41 surrounds the radial first bores 33 in the radial direction, and the second stator end winding 42 surrounds the radial second bores 34. During a rotation of the first shaft journal 2, of the filler body 5 and of the second shaft journal 3, cooling medium which is situated within a cooling duct 23 of the rotor 1 is—as described in connection with FIG. 5—conveyed through the cooling duct 23 and centrifuged out of the radial bores 33 and 34 in the direction of the stator end windings 41 and 42. During the further course of its movement, the cooling medium which is centrifuged out of the radial bores 33 and 34 impinges in particular on the stator end windings 41 and 42 and cools them. Subsequently, the cooling medium drips into a sump 43 of a first housing portion 44 of the electric machine 1.

The cooling medium which is conducted through the cooling duct 23 and which has dripped into the sump 43 after cooling in particular of the stator end windings 41 and 42 can be conducted through a heat exchanger 45 in order to be re-cooled there. Conveyance of the cooling medium out of the sump 43 through the heat exchanger 45 and through the cooling duct 23 can be performed by means of a pump (not shown) or by helical cooling ducts within the laminated rotor core 4. In this way, a recirculation cooling circuit 46 is formed, the possible course of which is indicated in FIG. 13 using a dash-dotted line. In order to re-cool the cooling medium within the heat exchanger 45, cooling water flows through said heat exchanger, which cooling water is circulated in a main cooling circuit 47 within which a main water cooler 48 for re-cooling the cooling water is located. The cooling water may circulate within the main cooling circuit 47 by means of a pump (not shown).

FIG. 13 furthermore shows that the first shaft journal 2 is mounted rotatably in a first bearing 49 which is fastened within the first housing portion 44, and that the second shaft journal 3 is mounted rotatably in a second bearing 50 which is likewise fastened within the first housing portion 44. A transmission 52 with a further sump 53 is located in a second housing section 51. The transmission 52 is connected to the second shaft journal 3 by means of a first gear 54, wherein an output shaft 55 of the transmission 52 is mounted rotatably in a third bearing 56 and protrudes out of the second housing portion, wherein the third bearing 56 is fastened within the second housing portion 51.

Figure 14:
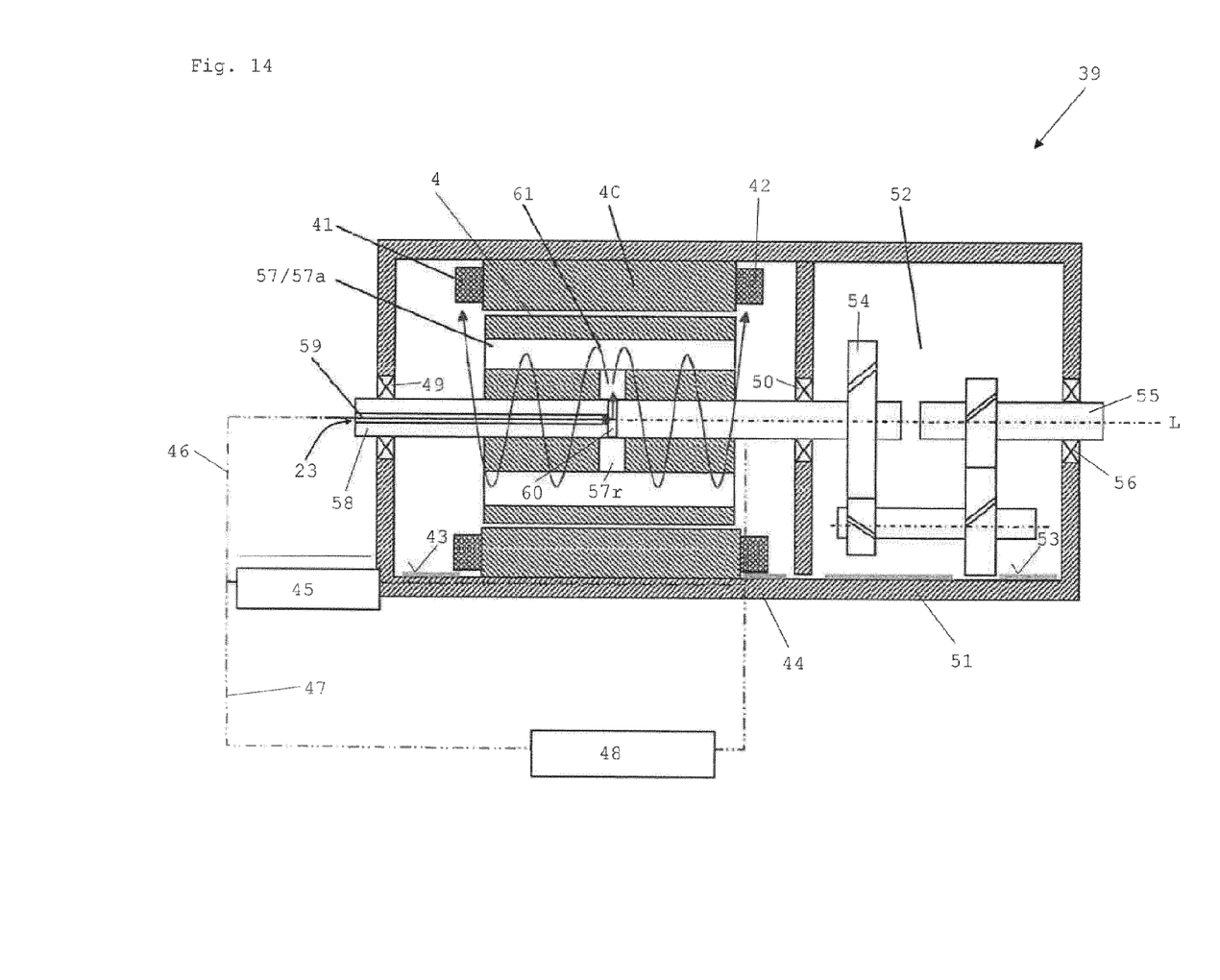
FIG. 14 is a longitudinal sectional illustration of a further electric machine incorporating teachings of the present disclosure.

FIG. 14 shows a further electric machine 1 with a laminated rotor core 4. The laminated rotor core 2 is surrounded in the radial direction by a stator 40 having a first stator end winding 41, which is illustrated on the left in FIG. 14, and having a second stator end winding 42, which is illustrated on the right in FIG. 14. The laminated rotor core 4 furthermore comprises cooling ducts 57, which extend through the laminated rotor core 4 in an axial direction L and in a radial direction and which, for this purpose, have axial cooling duct portions 57a and radial cooling duct portions 57r. A rotor shaft 58 of the electric machine 1 is designed as a hollow shaft and has an axial bore 59 running in the axial direction or longitudinal direction L of the rotor shaft 58. The axial bore 59 begins at a first end side, illustrated on the left in FIG. 14, of the rotor shaft 58. The axial bore 59 extends through the rotor shaft 58 over approximately half of the extent thereof and then transitions into multiple radial bores 60, distributed around the circumference of the rotor shaft 58, which connect the axial bore 59 to an outer lateral surface of the rotor shaft 58 and open into the radial cooling duct portions 57r of the laminated rotor core 4.

During a rotation of the rotor shaft 58, a cooling medium situated within the axial bore 59 of the rotor shaft 58 is conveyed through the axial bore 59 and is conducted or centrifuged out of the radial bores 60 into the radial cooling duct portions 57*r* of the laminated rotor core 4. From there, the cooling medium flows through the axial cooling duct portions 57*a* of the laminated rotor core 4 to the end sides thereof, from where said cooling medium is centrifuged in the direction of the stator end windings 41 and 42 and, during the further course of its movement, is in particular centrifuged onto the stator end windings 41, 42 and cools these. Subsequently, the cooling medium drips into a sump 43 of a first housing portion 44 of the electric machine 39. A possible course of the coolant within the bores 60 of the rotor shaft 58 and the cooling duct portions 57*r*, 57*a* is indicated in FIG. 14 by means of arrows 61. The rest of the elements from FIG. 14 correspond to those of the exemplary embodiment according to FIG. 13.

What is claimed is:

1. A rotor for an electric machine, the rotor comprising:
a first shaft journal;
a second shaft journal;
a laminated rotor core;
a filler body cast onto the laminated rotor core wherein the filler body and the laminated rotor core rotate conjointly;
wherein the filler body rotates with the shaft journals and a torque applied to the shaft journals is transmitted to the laminated rotor core;
a cooling duct extending through the shaft journals and the filler body along an axis of the filler body and the rotor core; and
a media duct element arranged between the shaft journals and internal to the filler body;
wherein the first shaft journal includes a first axial bore;
the second shaft journal includes a second axial bore;
an exterior of the media duct element and an interior of the filler body in conjunction form a jacket-like cavity surrounding the cooling duct;
the media duct element defines a fourth axial bore connecting the first axial bore to the second axial bore, so the first axial bore, the second axial bore, and the fourth axial bore together form the cooling duct running through the first shaft journal, the second shaft journal, and the media duct element;
a first short-circuiting ring; and
a second short-circuiting ring;
wherein the first shaft journal includes a first radial bore;
the second shaft journal includes a second radial bore;
the first radial bore is connected to the first axial bore;
the second radial bore is connected to the second axial bore;
the first short-circuiting ring radially surrounds the first radial bore; and
the second short-circuiting ring radially surrounds the second radial bore so, during a rotation of the shaft journals, a cooling medium may be forced out of the radial bores radially to the outside in the direction of the short-circuiting rings and come in contact with the short-circuiting rings.

2. The rotor as claimed in claim 1, wherein:
the media duct element defines a third radial bore and a fourth radial bore;
the third radial bore and the fourth radial bore connect the fourth axial bore to the jacket-like cavity;
the first shaft journal and the filler body between them form a first passage connecting the jacket-like cavity to the first short-circuiting ring; and the second shaft journal and the filler body between them form a second passage connecting the jacket-like cavity to the second short-circuiting ring.

3. An electric machine comprising:
a stator with a first stator end winding and a second stator end winding; and
a rotor comprising a first shaft journal, a second shaft journal, a laminated rotor core, a filler body cast onto the laminated rotor core wherein the filler body and the laminated rotor core rotate conjointly, and a cooling duct extending through the shaft journals and the filler body along an axis of the filler body and the rotor core;
a media duct element arranged between the shaft journals and the filler body;
a first short-circuiting ring; and
a second short-circuiting ring;
wherein the filler body rotates with the shaft journals and a torque applied to the shaft journals is transmitted to the laminated rotor core; and
the first stator end winding surrounds the first short-circuiting ring;
the second stator end winding surrounds the second short-circuiting ring;
during a rotation of the shaft journals, a cooling medium is forced out of radial bores in the filler body, radially to the outside in the direction of the stator end windings and comes in contact with the stator end windings;
the first shaft journal includes a first axial bore;
the second shaft journal includes a second axial bore;
the media duct element and the filler body in conjunction form a jacket-like cavity; and
the media duct element defines a fourth axial bore connecting the first axial bore to the second axial bore, so the first axial bore, the second axial bore, and the fourth axial bore together form the cooling duct running through the first shaft journal, the filler body, and the media duct element.

4. The rotor as claimed in claim 3, wherein:
the filler body has a third axial bore connecting the first axial bore to the second axial bore; and
the first axial bore, the second axial bore, and the third axial bore form the cooling duct.

5. The rotor as claimed in claim 3, wherein the first shaft journal, the second shaft journal, and the filler body are formed in one piece.

6. The rotor as claimed in claim 3, wherein at least one of the shaft journals includes a projection arranged on an end side of the respective shaft journal, for centering purposes.

7. The rotor as claimed in claim 3, wherein at least one of the shaft journals includes an end plate arranged on an end side of the respective shaft journal, for fastening to the filler body.

8. The rotor as claimed in claim 3, wherein the media duct element is formed in one piece with at least one of the first shaft journal and the second shaft journal.

9. The rotor as claimed in claim 3, further comprising:
a first short-circuiting ring; and
a second short-circuiting ring;
wherein the first shaft journal includes a first radial bore;
the second shaft journal includes a second radial bore;
the first radial bore is connected to the first axial bore;
the second radial bore is connected to the second axial bore;
the first short-circuiting ring radially surrounds the first radial bore; and
the second short-circuiting ring radially surrounds the second radial bore so, during a rotation of the shaft journals, a cooling medium may be forced out of the radial bores radially to the outside in the direction of the short-circuiting rings and come in contact with the short-circuiting rings.

10. The rotor as claimed in claim 3, wherein:
the media duct element defines a third radial bore and a fourth radial bore;
the third radial bore and the fourth radial bore connect the fourth axial bore to the jacket-like cavity;
the first shaft journal and the filler body between them form a first passage connecting the jacket-like cavity to the first short-circuiting ring; and
the second shaft journal and the filler body between them form a second passage connecting the jacket-like cavity to the second short-circuiting ring.

\* \* \* \* \*